US012396048B2

United States Patent
Dong

(10) Patent No.: US 12,396,048 B2
(45) Date of Patent: Aug. 19, 2025

(54) CHANNEL SWITCHING METHOD, APPARATUS, DEVICE, AND READABLE STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 490 days.

(21) Appl. No.: 17/909,914

(22) PCT Filed: Mar. 9, 2020

(86) PCT No.: PCT/CN2020/078378
§ 371 (c)(1),
(2) Date: Sep. 7, 2022

(87) PCT Pub. No.: WO2021/179111
PCT Pub. Date: Sep. 16, 2021

(65) Prior Publication Data
US 2023/0103595 A1    Apr. 6, 2023

(51) Int. Cl.
*H04W 76/15* (2018.01)
*H04W 72/0453* (2023.01)

(52) U.S. Cl.
CPC ....... *H04W 76/15* (2018.02); *H04W 72/0453* (2013.01)

(58) Field of Classification Search
CPC .......................... H04W 76/15; H04W 72/0453
See application file for complete search history.

(56) References Cited

U.S. PATENT DOCUMENTS

| 7,177,308 B2 | 2/2007 | Ofek et al. |
| 2003/0171116 A1* | 9/2003 | Soomro ............... H04W 72/54 455/445 |
| 2014/0211686 A1 | 7/2014 | Cariou et al. |
| 2018/0206284 A1* | 7/2018 | Zhou ..................... H04L 1/1887 |
| 2019/0037462 A1* | 1/2019 | Chowdhury .......... H04L 67/131 |
| 2019/0150150 A1* | 5/2019 | Calin ................ H04W 72/0453 370/329 |

(Continued)

FOREIGN PATENT DOCUMENTS

| CN | 104579949 A | 4/2015 |
| CN | 110167201 A | 8/2019 |

(Continued)

OTHER PUBLICATIONS

International Search Report of PCT/CN2020/078378, dated Dec. 3, 2020 with English translation, (4p).

(Continued)

*Primary Examiner* — Ajay Cattungal
(74) *Attorney, Agent, or Firm* — Arch & Lake LLP

(57) ABSTRACT

The present disclosure provides a channel switching method, a device, and a readable storage medium. The method includes: generating, by a first device, a multi-link channel switching frame under a link, in which the multi-link channel switching frame is configured to indicate a channel switching to be performed under multiple links, and the multiple links are configured to indicate that the first device supports performing data transmissions simultaneously on at least two frequency bands.

18 Claims, 3 Drawing Sheets

(56) References Cited

U.S. PATENT DOCUMENTS

| | | | | |
|---|---|---|---|---|
| 2020/0396568 A1* | 12/2020 | Huang | ............... | H04W 76/40 |
| 2021/0029741 A1* | 1/2021 | Ghosh | ............... | H04W 74/0816 |
| 2021/0212141 A1* | 7/2021 | Chu | ............... | H04W 48/12 |
| 2021/0212156 A1* | 7/2021 | Kwon | ............... | H04W 76/34 |
| 2021/0250848 A1* | 8/2021 | Seok | ............... | H04W 48/16 |
| 2022/0377839 A1* | 11/2022 | Jang | ............... | H04W 76/11 |

FOREIGN PATENT DOCUMENTS

| | | |
|---|---|---|
| CN | 110199494 A | 9/2019 |
| JP | 2013013161 A | 1/2013 |
| WO | 2020032639 A1 | 2/2020 |

OTHER PUBLICATIONS

Hearing Notice for IN application 202247055726 dated Oct. 6, 2023, 2 pages.
Search Report for EP application 20923867.4 dated Oct. 11, 2023, 11 pages.
1 Office Action of Indian Application No. 202247055726 dated Dec. 12, 2022, (5p).

* cited by examiner

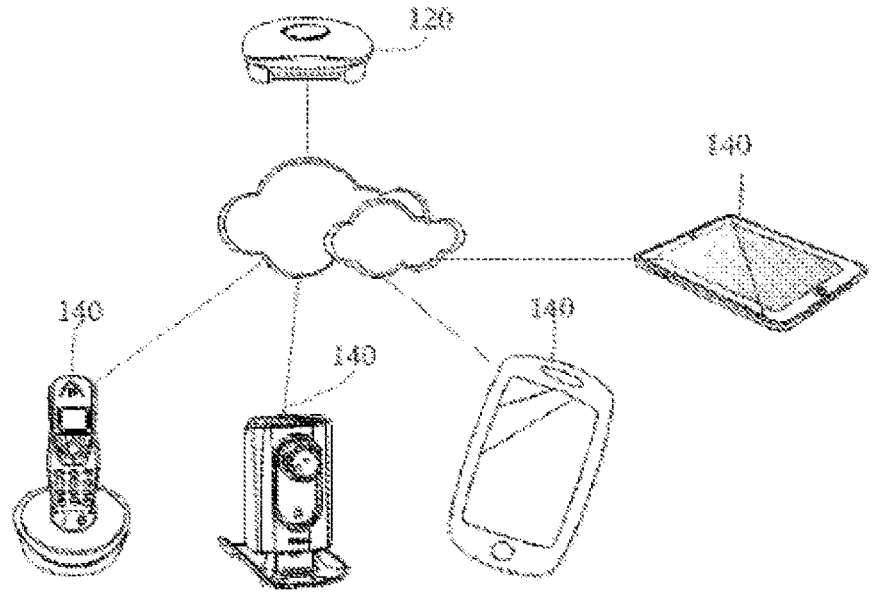
FIG. 1
| Category 220 | Spectrum Management Action 230 | Channel Switch Announcement element 210 | Secondary Channel Offset element 240 | Mesh Channel Switch Parameters element 250 | Wide Bandwidth Channel Switch element 260 | New Transmit Power Envelop element 270 |
|---|---|---|---|---|---|---|
| 1 | 1 | 5 | 0or3 | 0or8 | 0or5 | Variable |
| Element ID 221 | Length 222 | Channel Switch Mode 223 | New Channel Number 224 | Channel Switch Count 225 |
|---|---|---|---|---|
| 1 | 1 | 1 | 1 | 1 |
FIG. 2
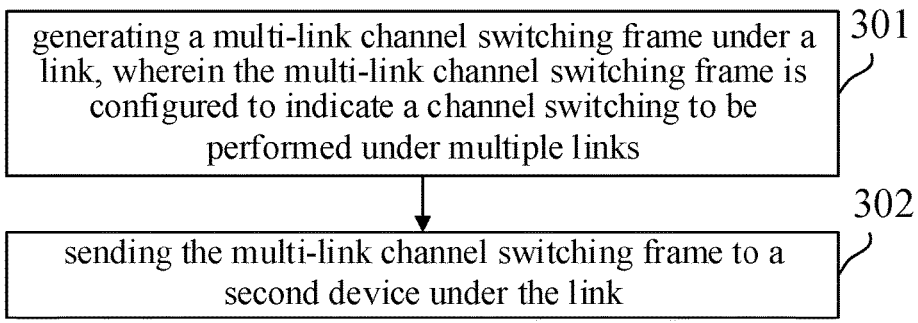
FIG. 3

| Category 410 | Spectrum management action 420 | Channel switch announcement 430 | Secondary channel offset element 440 |
|---|---|---|---|

FIG. 4

| Element ID 510 | Length 520 | SCO 530 |
|---|---|---|
| 1 | 1 | 1 |

FIG. 5

| Value | Name | Description |
|---|---|---|
| 0 | SCN-no secondary channel | Indicates that no Secondary channel is present |
| 1 | SCA-Secondary Channel Above | Indicates that the secondary channel is above the primary channel |
| 2 | | reserved |
| 3 | SCB-Secondary Channel Below | Indicates that the secondary channel is below the primary channel |
| 4-255 | | reserved |

FIG. 6

| Element ID 710 | Length 720 | SCO 730 | Channel Switch mode 740 | frequency band indication 750 (Link1) | New Channel number 760 | Channel switch count 770 | Channel Switch mode 740 | frequency band indication 750 (Link2) | New Channel number 760 | Channel switch count 770 | ... |
|---|---|---|---|---|---|---|---|---|---|---|---|

FIG. 7

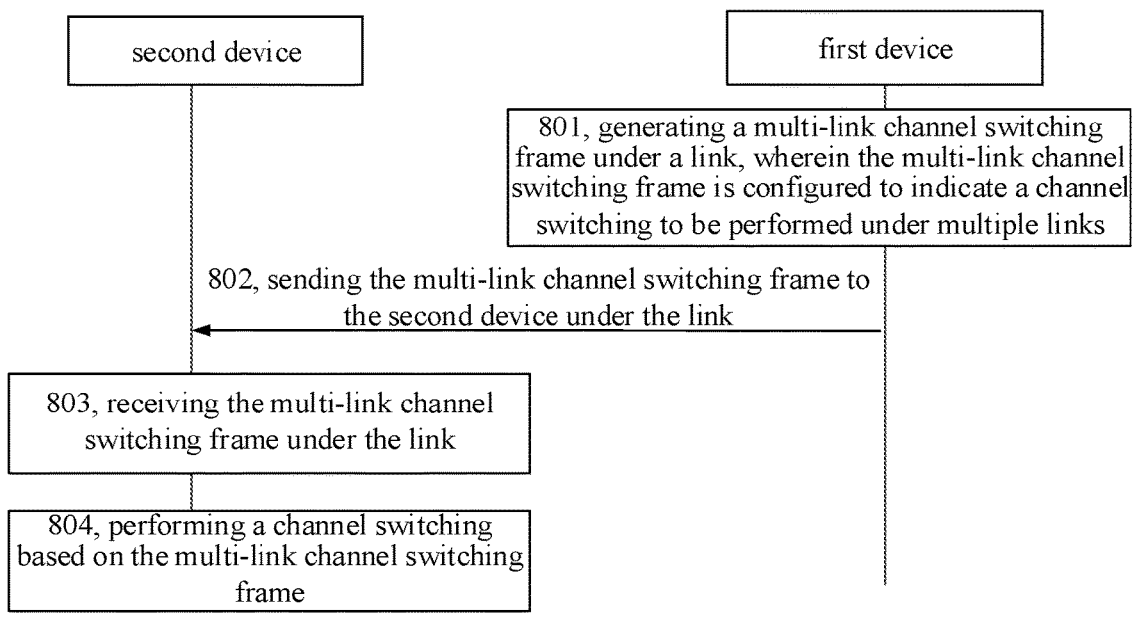

FIG. 8

CHANNEL SWITCHING METHOD, APPARATUS, DEVICE, AND READABLE STORAGE MEDIUM

CROSS-REFERENCE TO RELATED APPLICATION

This application is a U.S. national phase of International Application No. PCT/CN2020/078378, filed with the State Intellectual Property Office of P. R. China on Mar. 9, 2020, the entire content of which is incorporated by reference for all purposes.

TECHNICAL FIELD

The disclosure relates to a field of communication technologies, and particularly to a channel switching method and apparatus, a device and a readable storage medium.

BACKGROUND

In a wireless fidelity (Wi-Fi) technology, a research scope includes Wi-Fi transmission of 320 MHz bandwidth, aggregation and collaboration using multiple frequency bands and so on. A proposed vision is to improve the rate and throughput by at least four times compared to the existing standard IEEE802.11 ax. The main application scenario of the new technology includes video transmission, augmented reality (AR), virtual reality (VR) and so on.

The aggregation and collaboration using multiple frequency bands refers to that communications are performed between devices simultaneously in the 2.4 GHz, 5.8 GHz and 6-7 GHz frequency bands. Of course, the multiple frequency bands may be millimeter wave frequency bands, such as 45 GHz and 60 GHz frequency bands.

SUMMARY

The disclosure provides a channel switching method and apparatus, a device and a readable storage medium.

According to an aspect of the disclosure, a channel switching method is provided. The method is applied in a first device and includes generating a multi-link channel switching frame under a link. The multi-link channel switching frame is configured to indicate that a channel switching is performed under multiple links, and the multiple links are configured to indicate that the first device supports performing data transmissions simultaneously on at least two frequency bands.

According to another aspect of the disclosure, a channel switching method is provided. The method is applied in a second device and includes receiving a multi-link channel switching frame under a link. The multi-link channel switching frame is configured to indicate that a channel switching is performed under multiple links, and the multiple links are configured to indicate that the second device supports performing data transmissions simultaneously on at least two frequency bands.

According to another aspect of the disclosure, a channel switching apparatus is provided. The apparatus is applied in a first device and includes a processing module. The processing module is configured to generate a multi-link channel switching frame under a link. The multi-link channel switching frame is configured to indicate that a channel switching is performed under multiple links, and the multiple links are configured to indicate that the first device supports performing data transmissions simultaneously on at least two frequency bands.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 is a schematic diagram illustrating a communication system according to an example.

FIG. 2 is a schematic diagram illustrating a format of a channel switching field according to an example.

FIG. 3 is a flowchart illustrating a channel switching method according to an example of the disclosure.

FIG. 4 is a schematic diagram illustrating a format of a multi-link channel switching frame according to an example of the disclosure.

FIG. 5 is a schematic diagram illustrating a format of a secondary channel field indication field according to an example of the disclosure.

FIG. 6 is a schematic diagram illustrating an indication specification of a secondary channel indication field according to an example of the disclosure.

FIG. 7 is a schematic diagram illustrating a format of a channel switching indication field according to an example.

FIG. 8 is a flowchart illustrating a channel switching method according to an example of the disclosure.

DETAILED DESCRIPTION

Figure 9:
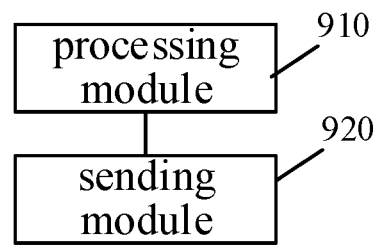
FIG. 9 is a block diagram illustrating a channel switching apparatus according to an example of the disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a schematic diagram illustrating a communication system according to an example. The communication system may include an access point (AP) 120 and a station 140.

The AP 120 is configured to provide a wireless access function. The AP 120 may be a wireless router, a base station with the Wi-Fi function and so on. One AP 120 may access multiple stations 140.

The station 140 is configured to access the AP 120. The station 140 may be a mobile phone, a tablet, a notebook computer, an electronic book, a machine and so on.

The above communication system may be an institute of electrical and electronics engineers (IEEE) 802.11a/b/g/n/ac/ax/be communication network. In the examples of the disclosure, for example, the communication system is IEEE 802.11 be communication network.

A channel switching typically occurs in a situation where a quality of a current channel is poor or a wider channel is required for a communication. Typically, a channel switching frame sent from the AP to the station (STA) is configured to instruct the STA to switch a channel for the communication. As illustrated in FIG. 2, the channel switching frame 200 has a format as shown in the figure. The channel switching frame includes a channel switching field (Channel Switch Announcement element) 210 of 5 bytes, a Category field 220 of 1 byte, a Spectrum Management Action field 230 of 1 byte, a secondary channel indication field (Secondary Channel Offset element) 240 of 0 or 3 bytes, a Mesh Channel Switch Parameters element field 250 of 0 or 8 bytes, a Wide Bandwidth Channel Switch element field 260 of 0 or 5 bytes and a New Transmit Power Envelop element field 270 of variable bytes. A format of the channel switch announcement element field 210 is shown in FIG. 2, including a property field (Element ID) 221, a Length field 222, a switching restriction indication field (Channel Switch Mode) 223, a channel indication field (New Channel Number) 224 and a timing field (Channel Switch Count) 225. Each of the Element ID field 221, the Length field 222, the Channel Switch Mode field 223, the New Channel Number field 224 and the Channel Switch Count field 225 occupies 1 byte. In an existing standard, the channel switching frame is sent under a link/frequency band, which indicates that the communication between the AP and the STA is switched from one channel to another channel.

The multi-link refers to that a device performs data transmissions simultaneously on at least two frequency bands. The at least two frequency bands include at least two of the 2.4 GHz frequency band, the 5.8 GHz frequency band and the 6-7 frequency band. For example, the device performs data transmissions simultaneously under the 2.4 GHz frequency band, the 5.8 GHz frequency band and the 6-7 frequency band. When data with the same content is transmitted under multiple links, a multi-link mode may improve a throughout of an entire system. When data with different contents is transmitted under multiple links, the multi-link mode may improve a success rate of sending/receiving the data.

Under the 2.4 GHz frequency band, there are fourteen channels. For example, a frequency range of the 2.4 GHz frequency band is 2.4 GHz-2.4835 GHz. Under the 2.4 GHz frequency band, a channel 01 has a central frequency of 2412 MHz and a frequency range of 2401 MHz-2423 MHz, a channel 02 has a central frequency of 2417 MHz and a frequency range of 2406 MHz-2428 MHz, and so on.

In IEEE 802.11, the device may perform the communication under multiple links. According to an existing protocol standard, the channel switching frame needs to be sent in multiple channels to perform the channel switching under the multiple links. For example, the channel switching frame is sent simultaneously in multiple channels, or the channel switching frame is sent in each channel respectively, both of the above two channel switching modes under the multiple links may cause a huge of signaling overhead.

In the examples of the disclosure, a channel switching method is provided, which may provide a channel switching mechanism under multiple links, thus improving an effective utilization of frequency spectrum. FIG. 3 is a flowchart of a channel switching method according to an example of the disclosure. For example, the method is applied in a first device, and the first device may be implemented as an AP. As illustrated in FIG. 3, the method includes the following.

At block 301, a multi-link channel switching frame is generated under a link. The multi-link channel switching frame is configured to indicate that a channel switching is performed under multiple links.

The multiple links are configured to indicate that the first device supports performing data transmissions simultaneously on at least two frequency bands.

For example, a format of the multi-link channel switching frame is shown in FIG. 4. The multi-link channel switching frame includes a Category field 410, a Spectrum management action field 420, a Channel switch announcement field 430 and a Secondary channel offset (SCO) element field 440. The Spectrum management action field 420 is configured to indicate that the current frame is a new action frame, i.e., the current frame is a multi-link channel switching frame. The Channel switch announcement field 430 is configured to configure a channel switching mode. The SCO field 440 is configured to indicate an inclusion situation of a secondary channel in a frequency band.

In some examples, the multi-link channel switching frame includes a frequency band indication field and a channel indication field. The frequency band indication field is configured to indicate a target frequency band of the channel switching, and the channel indication field is configured to indicate a target channel of the channel switching in the target frequency band. In some examples, the frequency band indication field and the channel indication field are in the Channel switch announcement field.

The first device is configured with a correspondence between a link identification and the target frequency band, and the frequency band indication field is configured to indicate the target frequency band with the link identification. For example, the link identification 1 corresponds to the 2.4 GHz frequency band, and the link identification 2 corresponds to the 5 GHz frequency band. For example, if the multi-link channel switching frame includes the link identification 1 and the channel indication field 02 corresponding to the link identification 1, it represents that the multi-link channel switching frame indicates that the channel is switched to the channel 02 in the 2.4 GHz frequency band for the communication. For example, the multi-link channel switching frame includes the Link1 field and the New Channel number field corresponding to the Link1, the Link2 field and the New Channel number field corresponding to the Link2. The Link1 field corresponds to the 2.4 GHz frequency band, and the Link2 field corresponds to the 5 GHz frequency band. The New Channel number field corresponding to the Link1 has a value of 02, and the New Channel number field corresponding to the Link2 has a value of 05. It indicates that the channel is switched to the channel 02 in the 2.4 GHz frequency band, and the channel is switched to the channel 05 in the 5 GHz frequency band.

In some examples, the multi-link channel switching frame further includes a timing field. The timing field is configured to indicate a switching time point of switching to the target channel in the target frequency band. The timing field is assigned a value based on a number of target beacon transmission times (TBTTs). The timing field has the same value or different values for multiple links. In some examples, a time point of a TBTT establishing an initial link is configures as a reference, timing is conducted with the number of TBTTs. In the example of the disclosure, for example, the timing field has different values for different frequency bands. For example, for Link1, the Channel switch count field is used as the timing field and has a value of 12. Link1 corresponds to the 2.4 GHz frequency band. In the 2.4 GHz frequency band, the channel switching is started at the 12th TBTT after the establishment of the initial link.

The multi-link channel switching frame is generated under one link of the multiple links. In some examples, the link is a link of establishing an initial association between the first device and the second device. For example, the initial association is established between the second device and the first device through the 2.4 GHz frequency band, the multi-link channel switching frame is generated under the 2.4 GHz frequency band.

In some examples, the multi-link channel switching frame further includes a secondary channel indication field. The secondary channel indication field is configured to indicate an inclusion situation of a secondary channel in the target frequency band. The new channel switched to in the link may include a secondary channel, and the SCO field exists to indicate whether the secondary channel exists in each link. When the secondary channel exists, a secondary channel field indication field is added in the Channel switch announcement field to indicate whether the secondary field exists in each link. The format of the secondary channel field indication field is shown in FIG. 5, including an Element ID field 510 of 1 byte, a Length field 520 of 1 byte, and a SCO field 530 of 1 byte. An indication specification of the SCO field 530 is illustrated in FIG. 6. When value="0" and name="SCN-no secondary channel", it indicates there is no secondary channel, and the description information is "Indicates that no Secondary channel is present", which means that there is no secondary channel for the current primary channel. When value="1" and name="SCN-Secondary Channel Above", it indicates a frequency range of the secondary channel is an upper frequency range, and the description information is "Indicates that the secondary channel is above the primary channel", which means that the frequency range of the secondary channel is a frequency range after the frequency range of the current primary channel. When value="3" and name="SCN-Secondary Channel Below", it indicates a frequency range of the secondary channel is a lower frequency range, and the description information is "Indicates that the secondary channel is below the primary channel", which means that the frequency range of the secondary channel is a frequency range before the frequency range of the current primary channel. For example, the current frequency spectrum is 5120-5180, the frequency range of the working bandwidth of the primary channel is 5140-5160, when value="1", it indicates that the frequency range of the secondary channel is 5160-5180, when value="3", it indicates that the frequency range of the secondary channel is 5120-5140. In some examples, value="2" and value="4-255" are reserved fields.

In some examples, the multi-link channel switching frame further includes a switching restriction indication field (Channel Switch mode). The Channel Switch mode field is configured to indicate a condition restriction of the channel switching. In some examples, the condition restriction of the channel switching may be different or the same for the channel switching processes in different links. Each link corresponds to one Channel Switch mode field, to indicate the condition restriction of the channel switching under the link.

For example, in response to the switching restriction indication field having a first value, the switching restriction indication field is configured to indicate that the channel switching is performed in a basic service set (BSS) networking mode. In response to the switching restriction indication field having a second value, the switching restriction indication field is configured to indicate that the channel switching is performed in an independent basic service set (IBSS) networking mode. For example, the first value is 1, the second value is 0. The switching restriction indication field is assigned 1, it indicates that under the Link1, when performing the channel switching, the switching is performed in the BSS networking mode.

At block 302, the multi-link channel switching frame is sent to the second device under the link.

In some examples, the link is the link of establishing the initial association between the second device and the first device. That is, the first device sends the multi-link channel switching frame to the second device under the link after generating the multi-link channel switching frame under the link.

In some examples, the multi-link channel switching frame may be carried in indication information to be sent.

For example, with the format of the multi-link channel switching frame illustrated in FIG. 4, the Channel switch announcement field is shown in FIG. 7, including an Element ID field 710 (for indicating a property of information element, IE), a Length field 720, a SCO field 730, a Channel Switch mode field 740, a frequency band indication field 750, a New Channel number field 760 and a Channel switch count field 770. There may be multiple groups of the Channel Switch mode field 740, the frequency band indication field 750, the New Channel number field 760 and the Channel switch count field 770 according to different number of the multiple links. That is, for each link, there is a group of the Channel Switch mode field 740, the frequency band indication field 750, the New Channel number field 760 and the Channel switch count field 770.

In conclusion, with the channel switching method according to the example of the disclosure, by setting a multi-link channel switching frame, a channel switching mechanism under multiple links is defined, such that the sending of a channel switching frame under each of the multiple links is avoided, thus simplifying transmission of signaling and improving an effective utilization of frequency spectrum.

In an alternative example, after receiving the multi-link channel switching frame, the second device performs the channel switching based on the multi-link channel switching frame. The second device may be implemented as a STA. FIG. 8 is a flowchart illustrating a channel switching method according to an example of the disclosure. As illustrated in FIG. 8, the method includes the following.

At block 801, the first device generates a multi-link channel switching frame is generated under a link. The multi-link channel switching frame is configured to indicate that a channel switching is performed under multiple links.

In some examples, the multi-link channel switching frame includes a frequency band indication field and a channel indication field, the frequency band indication field is configured to indicate a target frequency band of the channel switching, and the channel indication field is configured to indicate a target channel of the channel switching.

The first device is configured with a correspondence between a link identification and the target frequency band, and the frequency band indication field comprises the link identification.

In some examples, the multi-link channel switching frame further includes a timing field, and the timing field is configured to indicate a switching time point of switching to the target channel in the target frequency band. The timing field is assigned a value based on a number of target beacon transmission times (TBTTs). The timing field may be the same or different for multiple links.

The multi-link channel switching frame is generated under one of the multiple links. In some examples, the link is a link of establishing an initial association between the second device and the first device.

At block 802, the first device sends the multi-link channel switching frame to the second device under the link.

In some examples, the link is the link of establishing the initial association between the second device and the first device. That is, the first device sends the multi-link channel switching frame to the second device under the link after generating the multi-link channel switching frame under the link.

At block 803, the second device receives the multi-link channel switching frame under one link.

Alternatively, the link is the link of establishing the initial association between the second device and the first device. The first device sends the multi-link channel switching frame to the second device under the link, and the second device receives the multi-link channel switching frame sent from the first device under the link.

At block 804, the second device performs a channel switching based on the multi-link channel switching frame.

In some examples, the multi-link channel switching frame includes a frequency band indication field and a channel indication field, the frequency band indication field is configured to indicate a target frequency band of the channel switching, and the channel indication field is configured to indicate a target channel of the channel switching. When the second device performs the channel switching based on the multi-link channel switching frame, the channel is switched to the target channel in the target frequency band for the communication.

In some examples, the second device is configured with a correspondence between a link identification and the target frequency band, and the frequency band indication field includes the link identification. The second device determines the target frequency band in which the channel switching is performed based on the link identification. For example, the link identification 1 corresponds to the 2.4 GHz frequency band, and the link identification 2 corresponds to the 5 GHz frequency band. For example, if the multi-link channel switching frame includes the link identification 1 and the channel indication field 02 corresponding to the link identification 1, it represents that the multi-link channel switching frame indicates that the channel is switched to the channel 02 in the 2.4 GHz frequency band for the communication, such that the second device switches to the channel 02 in the 2.4 GHz frequency band for the communication.

In some examples, the multi-link channel switching frame further includes a timing field, and the timing field is configured to indicate a switching time point of the channel switching. The second device performs the channel switching in response to the switching time point being up. The timing field is assigned a value based on a number of target beacon transmission times (TBTTs). The timing field may be the same or different for multiple links. In some examples, a time point of a TBTT establishing an initial link is configures as a reference, timing is conducted with the number of TBTTs.

In some examples, the multi-link channel switching frame further includes a secondary channel indication field. The secondary channel indication field is configured to indicate an inclusion situation of a secondary channel in the target frequency band. The new channel switched to in the link may include a secondary channel, and the SCO field exists to indicate whether the secondary channel exists in each link. When the secondary channel exists, a secondary channel field indication field is added in the Channel switch announcement field to indicate whether the secondary field exists in each link, and indicate a frequency range of the secondary channel.

In some examples, the multi-link channel switching frame further includes a switching restriction indication field (Channel Switch mode). The Channel Switch mode field is configured to indicate a condition restriction of the channel switching. In some examples, the condition restriction of the channel switching may be different or the same for the channel switching processes in different links. Each link corresponds to one Channel Switch mode field, to indicate the condition restriction of the channel switching under the link.

The second device performs the channel switching in response to the communication meeting the condition restriction.

For example, in response to the switching restriction indication field having a first value, the switching restriction indication field is configured to indicate that the channel switching is performed in a basic service set (BSS) networking mode, such that the second device performs the channel switching in the BSS networking mode. In response to the switching restriction indication field having a second value, the switching restriction indication field is configured to indicate that the channel switching is performed in an independent basic service set (IBSS) networking mode, such that the second device performs the channel switching in the ISS networking mode.

In conclusion, with the channel switching method according to the example of the disclosure, by setting a multi-link channel switching frame, a channel switching mechanism under multiple links is defined, such that the sending of a channel switching frame under each of the multiple links is avoided, thus simplifying transmission of signaling and improving an effective utilization of frequency spectrum.

FIG. 9 is a block diagram illustrating a channel switching apparatus according to an example of the disclosure. For example, the apparatus is applied in a first device. As illustrated in FIG. 9, the apparatus includes a processing module 910.

The processing module 901 is configured to generate a multi-link channel switching frame under a link. The multi-link channel switching frame is configured to indicate that a channel switching is performed under multiple links, and the multiple links are configured to indicate that the first device supports performing data transmissions simultaneously on at least two frequency bands.

In an alternative example, the apparatus further includes a sending module 920 configured to send the multi-link channel switching frame to a second device under the link.

In an alternative example, the multi-link channel switching frame includes a frequency band indication field and a channel indication field. The frequency band indication field is configured to indicate a target frequency band of the channel switching, and the channel indication field is configured to indicate a target channel of the channel switching in the target frequency band.

In an alternative example, the first device is configured with a correspondence between a link identification and the target frequency band, and the frequency band indication field is configured to indicate the target frequency band with the link identification.

In an alternative example, the multi-link channel switching frame further includes a timing field. The timing field is configured to indicate a switching time point of the channel switching.

In an alternative example, the timing field is assigned a value based on a number of target beacon transmission times (TBTTs).

In an alternative example, the link is used to establish an initial association between the first device and the second device.

In an alternative example, the multi-link channel switching frame further includes a secondary channel indication field. The secondary channel indication field is configured to indicate an inclusion situation of a secondary channel in the target frequency band.

In an alternative example, the multi-link channel switching frame further includes a switching restriction indication field. The switching restriction indication field is configured to indicate a condition restriction of the channel switching.

In an alternative example, the switching restriction indication field is configured to indicate that the channel switching is performed in a basic service set (BSS) networking mode in response to the switching restriction indication field having a first value; the switching restriction indication field is configured to indicate that the channel switching is performed in an independent basic service set (IBSS) networking mode in response to the switching restriction indication field having a second value.

Figure 10:
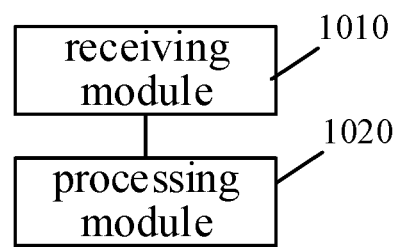
FIG. 10 is a block diagram illustrating a channel switching apparatus according to an example of the disclosure.

FIG. 10 is a block diagram illustrating a channel switching apparatus according to an example of the disclosure. For example, the apparatus is applied in a second device. As illustrated in FIG. 10, the apparatus includes a receiving module 1010.

The receiving module 1010 is configured to receive a multi-link channel switching frame under a link. The multi-link channel switching frame is configured to indicate that a channel switching is performed under multiple links, and the multiple links are configured to indicate that the second device supports performing data transmissions simultaneously on at least two frequency bands.

In an alternative example, the multi-link channel switching frame includes a frequency band indication field and a channel indication field, the frequency band indication field is configured to indicate a target frequency band of the channel switching, and the channel indication field is configured to indicate a target channel of the channel switching.

The apparatus further includes a processing module 1020 configured to switch to the target channel in the target frequency band for a communication according to the multi-link channel switching frame.

In an alternative example, the second device is configured with a correspondence between a link identification and the target frequency band, and the frequency band indication field comprises the link identification.

The processing module 1020 is further configured to determine the target frequency band according to the link identification.

In an alternative example, the multi-link channel switching frame further comprises a timing field, and the timing field is configured to indicate a switching time point of the channel switching.

The apparatus further includes a processing module 1020 configured to perform the channel switching in response to the switching time point being up.

In an alternative example, the timing field is assigned a value based on a number of target beacon transmission times (TBTTs).

In an alternative example, the link is used to establish an initial association between the first device and the second device.

In an alternative example, the multi-link channel switching frame further includes a secondary channel indication field, and the secondary channel indication field is configured to indicate an inclusion situation of a secondary channel in the target frequency band.

In an alternative example, the multi-link channel switching frame further comprises a switching restriction indication field, and the switching restriction indication field is configured to indicate a condition restriction of the channel switching.

The apparatus further includes a processing module 1020 configured to perform the channel switching in response to a communication meeting the condition restriction.

In conclusion, with the channel switching apparatus according to the example of the disclosure, by setting a multi-link channel switching frame, a channel switching mechanism under multiple links is defined, such that the sending of a channel switching frame under each of the multiple links is avoided, thus simplifying transmission of signaling and improving an effective utilization of frequency spectrum.

Figure 11:
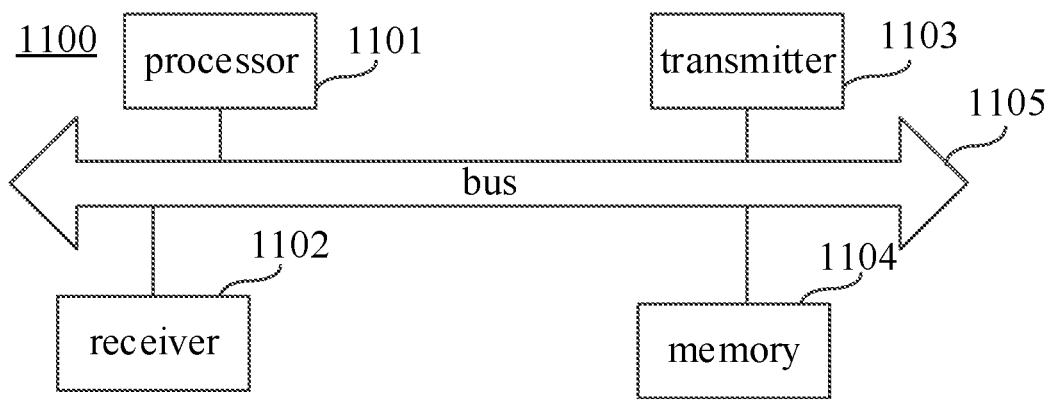
FIG. 11 is a schematic diagram illustrating a communication device according to an example of the disclosure.

FIG. 11 is a schematic diagram illustrating a communication device 1100 (the first device or the second device) according to an example of the disclosure. The second device includes a processor 1101, a receiver 1102, a transmitter 1103, a memory 1104 and a bus 1105.

The processor 1101 includes one or more processing cores. The processor 1101 executes software programs and modules to implement various functions and information processing.

The receiver 1102 and the transmitter 1103 may be one communication component. The communication component may be a communication chip.

The memory 1104 is coupled to the processor 1101 via the bus 1105.

The memory 1104 may be configured to store at least one instruction. The processor 1101 is configured to execute the at least one instruction to implement each step of the above method examples.

Further, the memory 1104 may be implemented by any type of temporary or non-temporary storage devices or their combination. The temporary or non-temporary storage devices include but are not limited to a magnetic disk or an optical disk, an electrically erasable programmable read-only memory (EEPROM), an electrically programmable read-only memory (EPROM), a static random access memory (SRAM), a read-only memory (ROM), a magnetic memory, a flash memory, a programmable read-only memory (PROM).

A non-transitory computer-readable storage medium is provided. When instructions stored in the non-transitory computer-readable storage medium are executed by a processor of a wireless communication device, the wireless communication device may perform the above mentioned channel switching method.

The example of the disclosure further provides a channel switching system. The system includes a first device and a second device.

The first device includes the channel switching apparatus provided in the example described with reference to FIG. 9.

The second device includes the channel switching apparatus provided in the example described with reference to FIG. 10.

The example of the disclosure further provides a computer-readable storage medium. The computer-readable storage medium is stored with at least one instruction, at least one segment of programs, a set of codes or instructions. The at least one instruction, the at least one segment of programs, the set of codes or instructions is loaded or executed by a processor to perform each step executed by the wireless communication device in the channel switching method according to the above method examples of the disclosure.

The examples provided in the disclosure may have at least the following beneficial effects.

By setting a multi-link channel switching frame, a channel switching mechanism under multiple links is defined, such that the sending of a channel switching frame under each of the multiple links is avoided, thus simplifying transmission of signaling and improving an effective utilization of frequency spectrum.

It should be understood that references herein to "a plurality" means two or more. "And/or", which describes an association relationship of associated objects, means that there can be three kinds of relationships, for example, A and/or B, which can mean that A exists alone, A and B exist at the same time, and B exists alone. The character "/" generally indicates that the associated objects are an "or" relationship.

Other implementations of the present disclosure will readily occur to those skilled in the art upon consideration of the specification and practice of the invention disclosed herein. The disclosure is intended to cover any variations, uses, or adaptations of the disclosure that follow the general principles of the disclosure and include common general knowledge or techniques in the technical field not disclosed by the disclosure. The specification and examples are to be regarded as exemplary only, the true scope and spirit of the disclosure being indicated by the following claims.

It should be understood that the disclosure is not limited to the precise structure described above and shown in the drawings, and various modifications and changes may be made without departing from its scope. The scope of the present disclosure is only limited by the appended claims.

The invention claimed is:

1. A channel switching method, comprising:
generating, by a first device, a multi-link channel switching frame under a link, wherein the multi-link channel switching frame is configured to indicate a channel switching to be performed under multiple links, and wherein the multiple links are configured to indicate that the first device supports performing data transmissions simultaneously on at least two frequency bands;
wherein, the multi-link channel switching frame comprises a frequency band indication field and a channel indication field, wherein the frequency band indication field is configured to indicate a target frequency band of the channel switching, and the channel indication field is configured to indicate a target channel of the channel switching in the target frequency band.

2. The method of claim 1, further comprising:
sending the multi-link channel switching frame to a second device under the link.

3. The method of claim 1, wherein,
the first device is configured with a correspondence between a link identification and the target frequency band, and the frequency band indication field is configured to indicate the target frequency band with the link identification.

4. The method of claim 1, wherein,
the multi-link channel switching frame further comprises a timing field, wherein the timing field is configured to indicate a switching time point of the channel switching.

5. The method of claim 4, wherein,
the timing field is assigned a value based on a number of target beacon transmission times (TBTTs).

6. The method of claim 1, wherein,
the link is configured to establish an initial association between the first device and the second device.

7. The method of claim 1, wherein,
the multi-link channel switching frame further comprises a secondary channel indication field, wherein the secondary channel indication field is configured to indicate an inclusion situation of a secondary channel in the target frequency band.

8. The method of claim 1, wherein,
the multi-link channel switching frame further comprises a switching restriction indication field, wherein the switching restriction indication field is configured to indicate a condition restriction of the channel switching.

9. The method of claim 8, wherein,
the switching restriction indication field is configured to indicate that the channel switching is performed in a basic service set (BSS) networking mode in response to the switching restriction indication field having a first value;
the switching restriction indication field is configured to indicate that the channel switching is performed in an independent basic service set (IBSS) networking mode in response to the switching restriction indication field having a second value.

10. A channel switching method, comprising:
receiving, by a second device, a multi-link channel switching frame under a link, wherein the multi-link channel switching frame is configured to indicate that a channel switching is performed under multiple links, and wherein the multiple links are configured to indicate that the second device supports performing data transmissions simultaneously on at least two frequency bands;
wherein, the multi-link channel switching frame comprises a frequency band indication field and a channel indication field, wherein the frequency band indication field is configured to indicate a target frequency band of the channel switching, and the channel indication field is configured to indicate a target channel of the channel switching;
the method further comprises:
switching to the target channel in the target frequency band for a communication according to the multi-link channel switching frame.

11. The method of claim 10, wherein, the second device is configured with a correspondence between a link identification and the target frequency band, and the frequency band indication field comprises the link identification;
the method further comprises:
determining the target frequency band according to the link identification.

12. The method of claim 10, wherein, the multi-link channel switching frame further comprises a timing field, wherein the timing field is configured to indicate a switching time point of the channel switching;
the method further comprises:
performing the channel switching in response to the switching time point being up.

13. The method of claim 12, wherein,
the timing field is assigned a value based on a number of target beacon transmission times (TBTTs).

14. The method of claim 10, wherein the link is configured to establish an initial association between the first device and the second device.

15. The method of claim 10, wherein the multi-link channel switching frame further comprises a secondary channel indication field, wherein the secondary channel indication field is configured to indicate an inclusion situation of a secondary channel in the target frequency band.

16. The method of claim 10, wherein the multi-link channel switching frame further comprises a switching restriction indication field, wherein the switching restriction indication field is configured to indicate a condition restriction of the channel switching; and
the method further comprises:
performing the channel switching in response to a communication meeting the condition restriction.

17. A wireless communication device, comprising:
a processor;
a transceiver coupled to the processor;
wherein the processor is configured to load and execute executable instructions to perform the channel switching method according to claim 10.

18. A wireless communication device, comprising:
a processor; and
a transceiver coupled to the processor;
wherein the processor is configured to load and execute executable instructions to perform the following step:
generating a multi-link channel switching frame under a link, wherein the multi-link channel switching frame is configured to indicate a channel switching to be performed under multiple links, and wherein the multiple links are configured to indicate that the first device supports performing data transmissions simultaneously on at least two frequency bands;
wherein, the multi-link channel switching frame comprises a frequency band indication field and a channel indication field, wherein the frequency band indication field is configured to indicate a target frequency band of the channel switching, and the channel indication field is configured to indicate a target channel of the channel switching in the target frequency band.

* * * * *